Feb. 24, 1942.  N. M. THOMAS  2,274,464
METHOD OF AND APPARATUS FOR MANUFACTURING CONFECTIONERY PRODUCTS
Filed Nov. 25, 1940  5 Sheets-Sheet 1
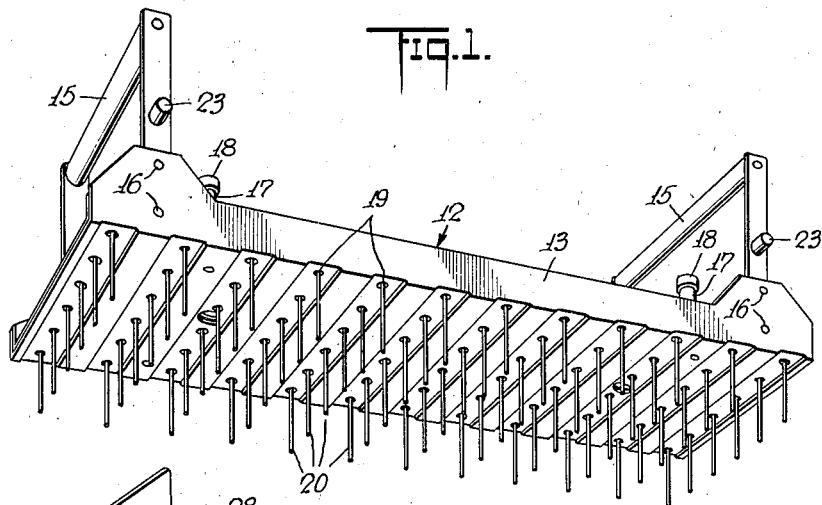
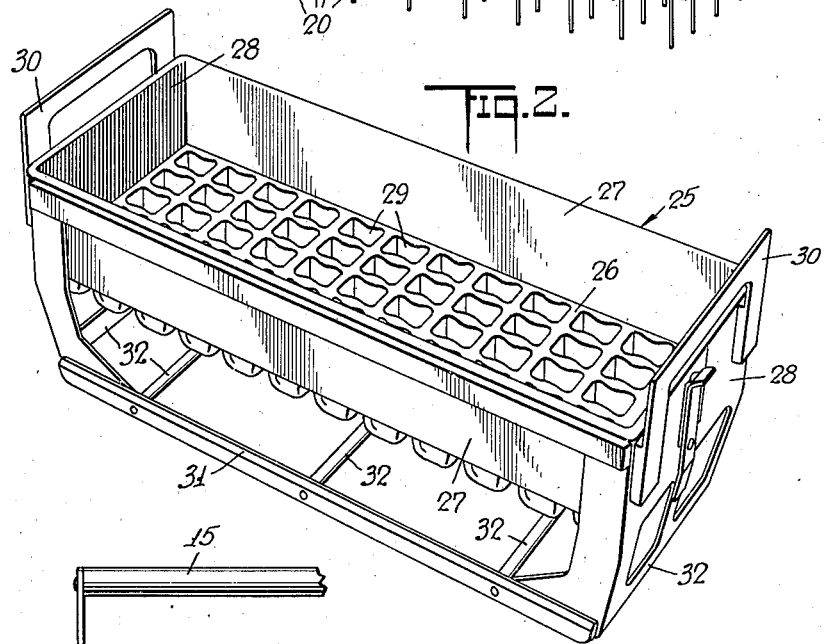
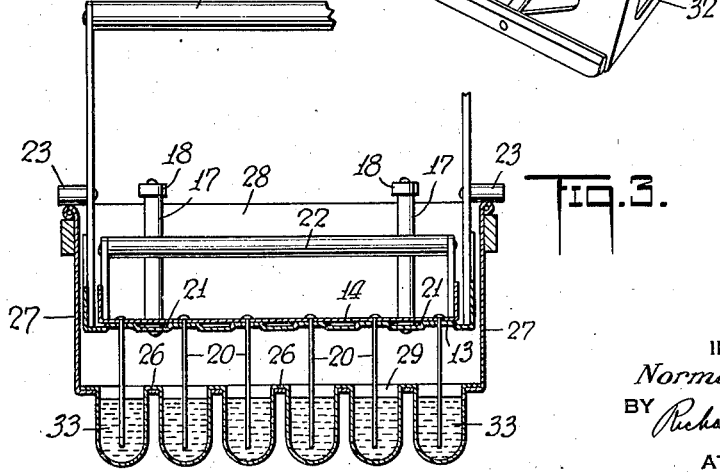
INVENTOR
Norman M. Thomas
BY
ATTORNEY

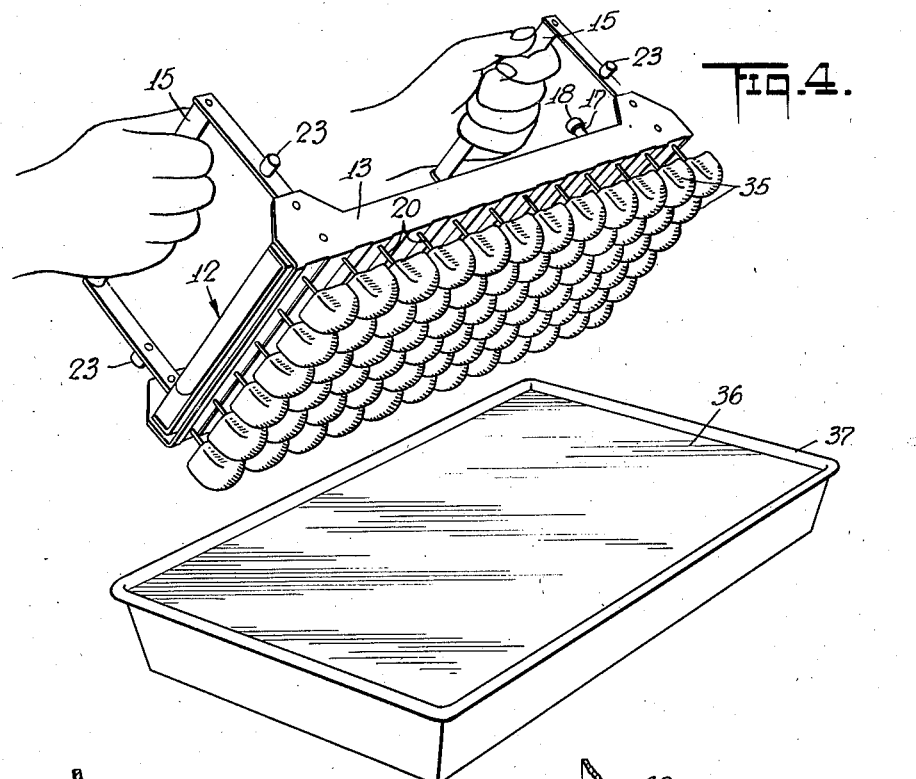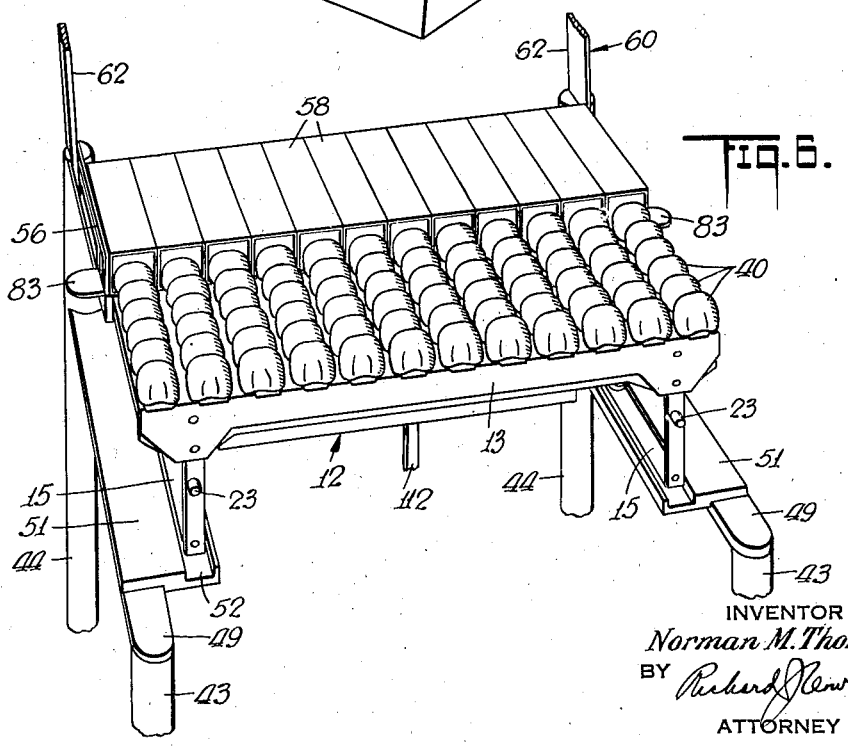

Feb. 24, 1942. N. M. THOMAS 2,274,464
METHOD OF AND APPARATUS FOR MANUFACTURING CONFECTIONERY PRODUCTS
Filed Nov. 25, 1940 5 Sheets-Sheet 3

INVENTOR
Norman M. Thomas
BY
ATTORNEY

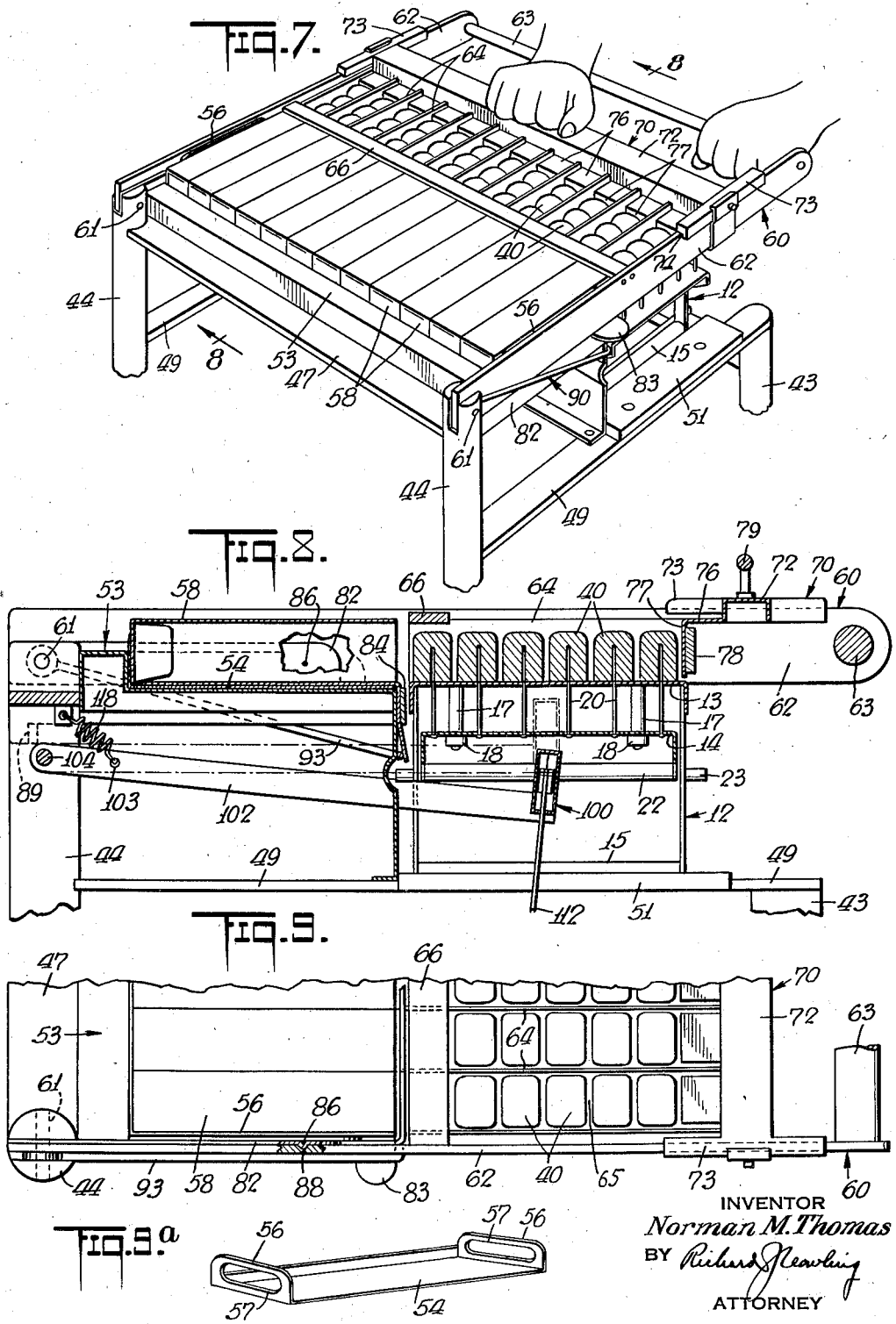

Feb. 24, 1942.      N. M. THOMAS      2,274,464
METHOD OF AND APPARATUS FOR MANUFACTURING CONFECTIONERY PRODUCTS
Filed Nov. 25, 1940     5 Sheets-Sheet 5
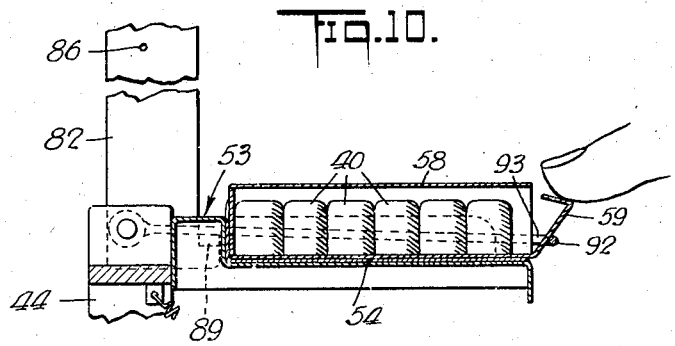
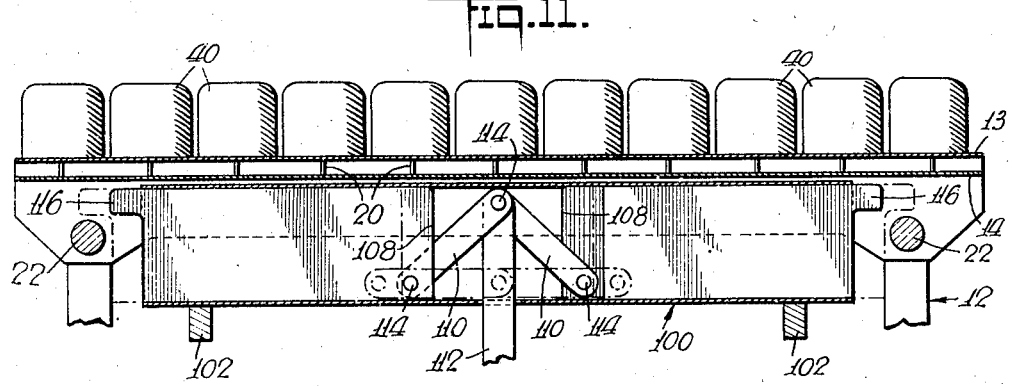
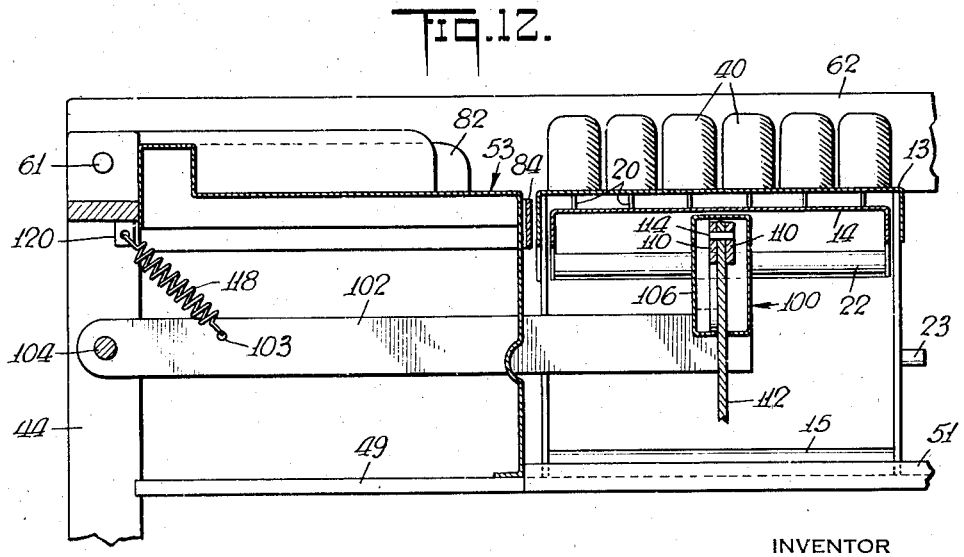
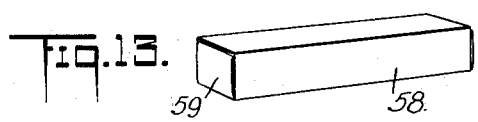
INVENTOR
*Norman M. Thomas*
BY
ATTORNEY Patented Feb. 24, 1942

2,274,464

UNITED STATES PATENT OFFICE 2,274,464

METHOD OF AND APPARATUS FOR MANUFACTURING CONFECTIONERY PRODUCTS

Norman M. Thomas, Medford Lakes, N. J., assignor to Joe Lowe Corporation, New York, N. Y., a corporation of Delaware Application November 25, 1940, Serial No. 367,141

18 Claims. (Cl. 107—45)

The present invention relates generally to the manufacture of frozen confectionery products of the type simulating the candy "bon bon," and it has relation specifically to a new and improved method of and apparatus for harvesting and packaging a plurality of such products simultaneously into a plurality of boxes in an efficient and sanitary manner.

It will be readily understood that the manufacture of such relatively small products, which are required to be retailed at a very low price in individual boxes, each box containing a plurality of such products, involve a number of manufacturing problems that are difficult of solution. With the present invention, however, all of these problems have been successfully overcome, and the harvesting and packaging accomplished economically and sanitary with a minimum amount of new apparatus and a limited number of operating steps.

An object of the present invention is to provide a new, novel and efficient method of harvesting and packaging a plurality of very small frozen confectionery products in a most economical, inexpensive and sanitary manner.

Another object of the invention is to provide simple, inexpensive and economical apparatus whereby the method of harvesting and packaging can be efficiently and sanitarily carried out with a minimum number of operating steps.

Other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Fig. 1 is a perspective view of a conventional spur plate apparatus, having a combined stripper plate, which is utilized in manipulating and harvesting the confectionery products during various manufacturing operations.

Fig. 2 is a perspective view of a conventional multi-cavity mold in which the frozen confectionery products are formed by congelation.

Fig. 3 is a transverse sectional view, showing the spur plate of Fig. 1 suspended over the mold of Fig. 2, in which manner the freezing of the liquid confectionery material into individual confectionery bodies is carried out, whereby the latter are bonded to the depending spurs of the spur plate by which they may be manipulated throughout the remaining steps of the manufacturing process;

Fig. 4 is a perspective view of the spur plate as it looks when removed from the mold, showing the individual confectionery bodies separately bonded to its depending spurs, and illustrating one way in which a protective outer coating may be applied thereto by immersion into a tank containing liquid coating material;

Fig. 6 is a fragmentary perspective view of the packaging platform of the apparatus shown in Fig. 5, showing a spur plate with its attached confectionery products juxtapositioned to a series of aligned boxes ready to be filled;

Fig. 7 is another perspective view of that portion of the apparatus shown in Fig. 6, but including the aligning means, and also illustrating the step of actually moving the rows of confectionery products from the spur plate to their respectively aligned boxes;

Fig. 8 is a sectional view of the apparatus shown in Fig. 7, the same having been taken substantially along the lines 8—8 thereof;

Fig. 9 is a fragmentary plan view on an enlarged scale of that portion of the apparatus shown in Figs. 7 and 8;

Fig. 9A is a perspective view of the removal tray which holds the aligned boxes during the packaging operation;

Fig. 10 is a view, in a different position, of that portion of the apparatus shown in Fig. 8, with the spur plate removed, illustrating the step of closing the end flaps of the individual boxes after the confectionery products have been deposited therein;

Fig. 11 is an enlarged sectional view of the mechanism employed in releasing the confectionery products from their respective spurs;

Fig. 12 is another view similar to Fig. 8, showing the stripping mechanism in its uppermost position; and Fig. 13 is a perspective of one of the filled individual boxes.

Figure 5:
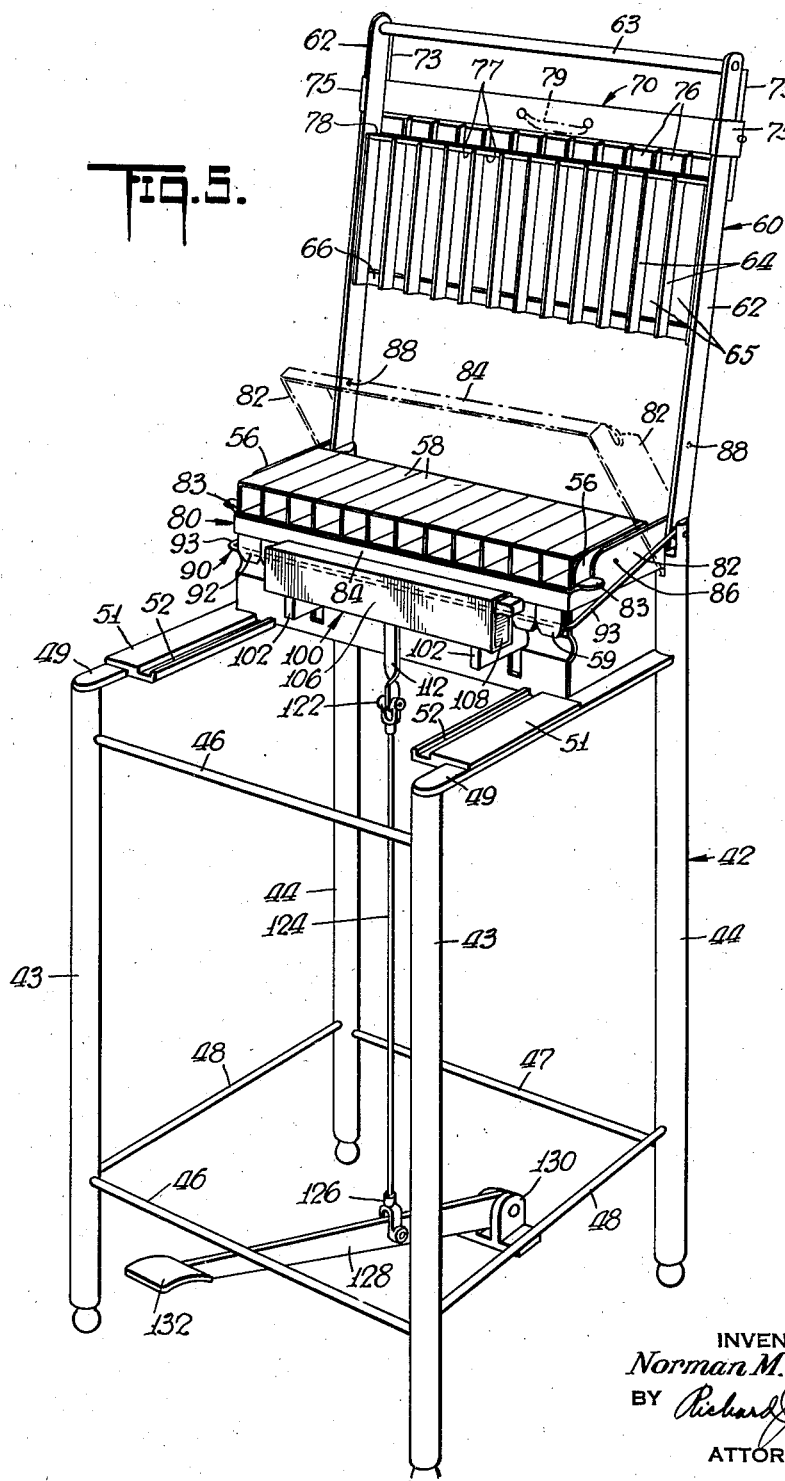
Fig. 5 is a perspective view of apparatus constructed in accordance with the invention for packaging simultaneously a plurality of individual confectionery products into a series of aligned open boxes.

Referring now to the drawings, wherein like numerals indicate like parts, there is shown in Fig. 1 a conventional portable spur plate or carrier 12, comprising a pair of superimposed slidably mounted marginal plates 13 and 14. The lower plate 13 having a plurality of transversely extending handles 15 fixedly secured thereto in any suitable manner as by spot welding, rivets, etc., as indicated at 16. A pair of oppositely disposed upstanding arms 17, having enlarged heads 18, are mounted adjacent each end of the lower plate 13, which serve as stops to limit the distance of separation between the plates 13 and 14. The lower plate 13 has a plurality of spaced apertures 19 arranged in rows transversely and longitudinally. The upper plate 14 is provided with a plurality of depending spurs 20 which are similarly spaced to correspond with the apertures 19 of the lower plate 13, and are adapted to extend therethrough when said plates are superimposed. Apertures 21 are also provided in the upper plate 14 for permitting the arms 17 to pass therethrough. The upper plate 14 is likewise provided with a pair of transversely extending handles 22, which are of less height than the handles 15. It will be noted that the handles 15 and 22 of the plates 13 and 14, respectively, are positioned adjacent each other so that both may be grasped by one hand for manual operation if desired. Suspending stops in the form of studs 23 are provided intermediate the uprights of the handles 15 for suspending the carrier 12 over a conventional mold structure 25, as best shown in Fig. 3.

The mold structure 25, which is best shown in Fig. 2, consists of a mold pan 26, having upstanding side-walls 27 and end walls 28, and a plurality of spaced mold cavities 29, which are similarly spaced in rows transversely and longitudinally to receive centrally one of the spurs 20 of the portable carrier 12 in each cavity. The mold structure 25 is provided at each end with suitable upstanding handles 30. A lattice-like frame work, consisting of longitudinally extending runners 31 and transversely extending reinforcing bars 32, is provided on the bottom of the mold structure 25, which serves to protect the bottoms of the depending cavities 29 from damage when the molds are moved by sliding through a brine tank, etc.

In making the confectionery products, the cavities 29 of the mold structure 25 may be filled in any desirable manner with a suitable liquid mixture 33 to be frozen, such as ice cream, ice milk, sherbet, water-ice, etc., as best shown in Fig. 3. The mold structure 25 is now ready to be placed in a brine tank or other refrigerating means (not shown). At such time, or prior thereto, the spur plate 12 is positioned over the mold structure 25 with the spurs 20 thereof extending one each into the mold cavity 29 when the suspending means 23 are resting on top of the side-walls 27 of the mold structure 25. When the liquid mixture 33 is congealed into a frozen form-retaining confectionery body 35, the mold structure 25 may be defrosted by momentarily immersing the bottom thereof in warm water (not shown) to break the bond formed between said frozen bodies 35 and the inner surfaces of the mold cavities 29. The frozen bodies 35, being bonded also to the depending spurs 20, may be withdrawn from their respective mold cavities 29 of the mold structure 25 by removing the portable carrier 12 therefrom. If an outer protective coating is to be applied to said confectionery bodies 35, this may be readily accomplished while they are still bonded to the spurs 20, by manually dipping them into a liquid coating material 36 in a tank 37, as best shown in Fig. 4. The coating material 36 will adhere evenly to the outer surfaces of the frozen bodies 35, and harden almost immediately due to the low temperature of said bodies, which are now ready for harvesting and boxing.

Referring now to Fig. 5, there is shown a harvesting and packaging apparatus 42 constructed in accordance with the invention. The apparatus 42 consists of a plurality of front supporting legs 43 and a plurality of rear supporting legs 44, the latter extending upwardly a short distance beyond the tops of the front legs 43. The front legs 43 are suitably braced transversely by cross rods 46, and the rear legs 44 are similarly braced by cross rods 47. The front legs 43 and rear legs 44 are suitably connected by lower cross rods 48 and upper cross bars 49. Tracks 51 are mounted on top of the cross bars 49 adjacent the front end thereof, having a channel 52 for receiving and supporting the handles 15 of the spur plate 12. Mounted transversely of the back of the apparatus 42 is an elevated depressed platform 53, which is adapted to act as a supporting means for receiving a removable box holding tray 54, having upstanding side flanges 56, the latter having slots 57 therein to provide hand holes for facilitating gripping. The tray 54, in the illustration shown, is of a size adapted to receive a series of twelve open-ended conventional boxes 58, having end closure flaps 59, said boxes being aligned in a side by side arrangement in a single plane, being one box for each transverse row of spurs 20 on the portable carrier 12. If desired, the boxes 58 may be suitably encased in a shipping wrapper or carton (not shown), whereby the entire assembly may be removed from the tray as a unit, or series of units, depending on the size of the carton, when the filling operation is completed.

A frame structure 60 is suitable mounted pivotally on a shaft 61 mounted transversely of a slot cut into the tops of the back legs 44. The frame structure 60, having side arms 62 connected at their front ends by a cross rod 63, has intermediate its ends a guiding means in the form of a series of transversely spaced longitudinally extending guide members 64, forming a series of troughs or passageways 65. The guide members 64 are fixedly suspended from cross bars 66 and 78 secured to the tops of the side arms 62.

A slidable member 70 is mounted transversely of the frame structure 60 on its side arms 62. The slidable member 70 consists of a channel-shape cross bar 72, having side runners 73 provided with channels 74 adapted to receive the top surface of the side arms 62. A clamping member 75 secures the runners 73 to the guide rails or side arms 62. A plurality of spaced integrally formed pusher fingers 76 are mounted across the front side of the cross bar 72, each finger 76 being adapted to fill the trough or passageway 65 space between adjacent guide members 64. The front edge of each pusher finger 76 is turned downwardly, as indicated at 77, to provide a relatively flat surface for engagement with the nearest confectionery product 40 of each row. A stop bar 78 is provided for limiting the forward movement of the member 70 on its guide rails 62. A manipulating handle 79 is mounted centrally of the top of the cross bar 72 to facilitate operation of the slidable member 70.

A second pivotal frame member 80 is mounted on the shaft 61 of the rear uprights 44 to provide means for holding down the open end flaps 59 of the boxes 58. The frame member 80 has a pair of side arms 82 provided with outwardly extending ears 83, forming suitable finger tabs for manipulating the same, and a transversely extending cross bar 84 which serves to engage and hold down the end flaps 59 of the boxes 58 during the filling operation. The side arms 82 are provided with projections 86 adapted to frictionally engage an indentation 88 on the side side arms 62 of the frame structure 60. In this manner the frame structure 60 and the frame structure 80 may be locked together and moved as a single unit, or separately, as desired. A lug 89 is formed adjacent the rear of each of the side arms 82 for providing means for engaging an associated pivotal frame member 90 hereinafter described.

The associated pivotal frame member 90 consists of a transversely extending cross bar 92 connected by side arms 93 pivotally mounted on the shaft 61 of the rear supporting legs 44. The bar 92 is adapted to be positioned below the forward ends of the boxes 58 and behind their downwardly projecting open-end flaps 59. It will be apparent that when the frame member 80 is raised upwardly removing its cross bar 84 from the end flaps 59 of the boxes 58, thereby releasing the same, the lugs 89, as best shown in Fig. 10, engage the side arms 93 of the frame member 90, and carries it upwardly, causing its cross bar 92 to force upwardly the depending end flaps 59 to a position whereby they may be easily and quickly manually slipped into their respective boxes to close the same.

Stripping means 100 is provided for automatically removing the spurs 20 from their respective confectionery products 40. This means consists of a pair of forwardly projecting horizontal arms 102 pivotally mounted on a shaft 104 journalled in the rear supporting legs 44. A housing 106 is mounted transversely of the arms 102 adjacent the forward ends thereof, and adapted to act as a guide track for a pair of spaced transversely slidable arms 108, which are pivotally connected by links 110 to a common lever 112 by suitable pins 114. A projecting finger 116 is provided adjacent the top and outside end of each arm 108, which fingers 116 are adapted to engage the handles 22 of the spur plate 12, as best shown in Fig. 8. Spring tensioning means 118 connects the arms 102 from a point 103 spaced from the legs 44 to a fastening lug 120, and provides means for maintaining normally the stripping means 100 in its uppermost position. The lever 112 is connected, as indicated at 122, to a link 124, which in turn is connected as at 126, to a foot treadle operated lever 128, fulcrumed at its rear end to the floor by means of a bifurcated plate member 130. The forward end of the lever 128 is provided with a foot pad 132.

In operation of the stripping means 100, it will be apparent that when pressure is applied downwardly on the foot pad 132 by the foot of the operator, the lever 128 pulls its connecting link 124 downwardly, which in turn pulls the lever 112 downwardly. When the lever 112 is moved downwardly, the links 110 force the arms 108 outwardly away from each other until they reach the dotted line position shown in Fig. 11. In this position the outwardly projecting fingers 116 are moved beyond the handles 22 of the spur plate 12. Further downward movement of the lever 112 pulls the housing 106 and its pivotal supporting arms 102 downwardly against the spring tensioning means 118. This further movement causes the fingers 116 to exert pressure downwardly on the handles 22, withdrawing the spurs 20 downwardly through the stripping plate 13. As the spurs 20 are withdrawn through the apertures 19 of the stripping plate 13, it exerts pressure against the bottom side of the confectionery products 40, forcing them from their respective spurs.

In harvesting and packaging the completed frozen confectionery products 40, the spur plate 12 after completion of the coating operation shown in Fig. 4, is inverted and manually positioned upon the tracks 51, with the handles 15 within the channels 52. It is assumed that the tray 54 has been loaded with boxes 58 and positioned in the depression of the elevated platform 53, with the open ended flaps 59 secured under the cross bar 84. The frame members 60 and 80 are moved to their horizontal positions, as best shown in Figs. 7 to 9. In this position it will be noted that each open-ended box 58 of the tray 54 is aligned with a transverse row of confectionery products 40 on the spur plate 12, and each transverse row is separated from its adjacent rows by the guide members 64.

The confectionery products 40 are now ready to be released from their respective spurs 20. This may be accomplished by depressing the foot pad 132, which in the manner heretofore described moves the fingers 116 over the handles 22 of the spur plate 12 and then forces them downwardly, withdrawing the spurs 20 through the top plate 13, forcing the confectionery products 40 therefrom and depositing them on the top side thereof. Thereupon, the slidable member 70, which is normally maintained in its forewardmost position against the stop bar 78, is ready to be moved backwardly of the frame member 60. Backward movement of the member 70 causes its pusher fingers 76 to engage the confectionery product 40 of each row nearest the operator and force all of the confections of the row longitudinally into its aligned box 58, the guides 64 preventing the confectionery products of a row from getting out of alignment with its box. The foot treadle may be released, and the frame members 60 and 80 moved to their vertical position as a unit, as shown best in Fig. 5. This releases the end flaps 59 of the boxes. When the member 80 approaches the end of its movement vertically, the lugs 89 engage the arms 93 of the associated frame member 90, moving its front cross bar 92 upwardly. This upward movement of the cross bar 92 brings the end flaps 59 of the boxes 58 into position for easy manual closing, as best shown in Fig. 10.

The tray 54 may now be removed from its depressed centering platform 53, and its contents packed in cartons for shipping. However, if the boxes 58 were packed in a wrapper or carton before being placed in the tray 54, they are ready for shipment as a unit without further packaging.

Although I have only described in detail one form which the invention may assume, it will be apparent to those skilled in the art that the invention is not so limited, but that various modifications may be made therein without departing from the spirit thereof or from the scope of the appended claims.

What I claim is:

1. The method of manufacturing and packaging a plurality of frozen confectionery products simultaneously which comprises filling a plurality of spaced rows of molds with material to be frozen, positioning a portable carrier over said spaced molds having depending spurs adapted to extend one each into said molds, refrigerating the material in said molds to congeal the same into confectionery units bonded to said spurs, defrosting the molds to release the confectionery units therefrom, positioning the spur plate before a series of open boxes aligned one to each row of confectionery units, withdrawing the spurs from their respective confectionery units, and moving all the confectionery units of a row simultaneously into its aligned box.

2. The method of manufacturing and packaging a plurality of frozen confectionery products simultaneously which comprises filling a plurality of spaced rows of molds with material to be frozen, positioning a portable carrier over said spaced molds having depending spurs adapted to extend one each into said molds, refrigerating the material in said molds to congeal the same into confectionery units bonded to said spurs, defrosting the molds to release the confectionery units therefrom, positioning the spur plate before a series of open boxes aligned one to each row of confectionery units, withdrawing the spurs from their respective confectionery units without altering their position of alignment, and moving all the confectionery units of a row simultaneously into its aligned box.

3. The method of manufacturing and packaging a plurality of frozen confectionery products simultaneously which comprises filling a plurality of spaced rows of molds with material to be frozen, positioning a portable carrier over said spaced molds having depending spurs adapted to extend one each into said molds, refrigerating the material in said molds to congeal the same into confectionery units bonded to said spurs, defrosting the molds to release the confectionery units therefrom, inverting the spur plate and positioning it in alignment with a series of open-ended boxes, one box being aligned with each row of confectionery units, withdrawing the spurs from their respective confectionery units without altering substantially their position, and then moving all of the confectionery units simultaneously whereby all of the confectionery units of a single row are moved into the box aligned with said row.

4. The method of manufacturing and packaging a plurality of frozen confectionery products simultaneously which comprises filling a plurality of spaced rows of molds with material to be frozen, positioning a portable carrier over said spaced molds having depending spurs adapted to extend one each into said molds, refrigerating the material in said molds to congeal the same into confectionery units bonded to said spurs, defrosting the molds to release the confectionery units therefrom, inverting the spur plate and positioning it so that the top side of the stripping plate is aligned horizontally with a series of aligned open-ended boxes, one box being aligned with each row of confectionery units, withdrawing the spurs from their respective confectionery units so that the latter are deposited on the top side of the stripping plate in alignment with said open-ended boxes, and then slidably moving the deposited confectionery units into said boxes.

5. Apparatus for harvesting and packaging a plurality of frozen confectionery units which comprises means for holding a plurality of individual boxes in alignment, means for receiving a portable carrier having a plurality of spaced rows of spaced confectionery units in juxtaposition to said aligned boxes whereby each row is aligned with one of said boxes, and means for laterally moving simultaneously the frozen confectionery units of a row from said carrier into its aligned box.

6. Apparatus for harvesting and packaging a plurality of frozen confectionery units which comprises means for holding a plurality of individual boxes in alignment, means for receiving a portable carrier having a plurality of spaced rows of spaced confectionery units in juxtaposition to said aligned boxes, means for guiding each row of confectionery units from said carrier to its aligned box, and means for moving simultaneously all of the rows of confectionery units into their respective boxes.

7. Apparatus for harvesting and packaging a plurality of frozen confectionery units which comprises means for holding a plurality of individual boxes in alignment, means for holding said boxes in open position, means for receiving a portable carrier having a plurality of spaced rows of spaced confectionery units in juxtaposition to said aligned boxes, means for guiding the confectionery units of each row from said carrier to its aligned box, and means for moving simultaneously all of the rows of confectionery units into their respective boxes.

8. Apparatus for harvesting and packaging a plurality of frozen confectionery units which comprises means for holding a plurality of individual boxes in alignment, means for holding said boxes in open position, means for receiving a portable carrier having a plurality of spaced rows of spaced confectionery units in juxtaposition to said aligned boxes, means adapted to be moved into position over said carrier for guiding the confectionery units of each row from said carrier to its aligned box, and slidable means for moving simultaneously all of the rows of confectionery units into their respective boxes.

9. Apparatus for harvesting and packaging a plurality of frozen confectionery units which comprises means for holding a plurality of individual boxes in alignment, means for receiving a portable carrier having a plurality of spaced rows of spaced confectionery units in juxtaposition to said aligned boxes whereby each row is aligned with one of said boxes, means for releasing the fixed confectionery units from said carrier, and means for moving simultaneously all of the rows of confectionery units into their respective boxes.

10. Apparatus for harvesting and packaging a plurality of frozen confectionery units which comprises means for holding a plurality of individual boxes in alignment, means for receiving a portable carrier having a plurality of spaced rows of spaced confectionery units in juxtaposition to said aligned boxes whereby each row is aligned with one of said boxes, means for actuating the stripping means of said carrier to release the fixed confectionery units therefrom and deposit them on its stripping plate, and means for moving simultaneously all of the rows of released confectionery units into their respective boxes.

11. Apparatus for harvesting and packaging a plurality of frozen confectionery units which comprises means for supporting a plurality of individual boxes in alignment, means for holding the closure flaps of said boxes in an open position, means for supporting a portable carrier having a plurality of spaced rows of spaced confectionery units in alignment with said boxes whereby each row is aligned with an individual box, means adapted to be moved into position over said carrier for guiding the confectionery units of each row from said carrier to its aligned box, means for actuating said carrier to release the confectionery units therefrom and means for slidably moving said rows of released confectionery units from said carrier to their respective boxes.

12. Apparatus for harvesting and packaging a plurality of frozen confectionery units which comprises means for removably supporting a plurality of individual boxes in alignment as a unit, means for holding the closure flaps of said boxes in an open position, means for supporting a portable carrier having a plurality of spaced rows of spaced confectionery units in alignment with said boxes whereby each row is aligned with an individual box, means adapted to be moved into position over said carrier for guiding the confectionery units of each row from said carrier to its aligned box, means for actuating said carrier to release the confectionery units therefrom, means for slidably moving said rows of released confectionery units from said carrier to their respective boxes, and means for bringing the closure flaps of said open boxes into position for closing.

13. Apparatus for harvesting and packaging a plurality of frozen confectionery units which comprises means for supporting a plurality of individual boxes in alignment, means for holding the closure flaps of said boxes in an open position, means for supporting a portable carrier having a plurality of spaced rows of spaced confectionery units in alignment with said boxes whereby each row is aligned with a separate box, means adapted to be pivotally moved into position over said carrier for guiding the confectionery units of each row from said carrier to its aligned box, means for actuating said carrier to release the confectionery units therefrom and means slidably mounted for moving simultaneously said rows of released confectionery units from said carrier to their respective boxes.

14. Apparatus for harvesting and packaging a plurality of frozen confectionery units which comprises means for supporting a plurality of individual boxes in alignment, means for holding the closure flaps of said boxes in an open position, means for supporting a portable carrier having a plurality of spaced rows of spaced confectionery units in alignment with said boxes whereby each row is aligned with a separate box, means adapted to be pivotally moved into position over said carrier for guiding the confectionery units of each row from said carrier to its aligned box, means for actuating said carrier to release the confectionery units therefrom, means slidably mounted for moving a simultaneously said rows of released confectionery units from said carrier to their respective boxes, and means associated with said flapholding means for bringing the closure flaps of said open boxes into position for closing when said boxes are filled.

15. The method of simultaneously harvesting and packaging a plurality of frozen confectionery products which are mounted releasably on spurs, which comprises positioning them in a row adjacent an open box, depositing them in alignment with the opening of said box, releasing said products from their respective spurs without altering their position of alignment, and moving all of the confectionery products of said row into said open box.

16. The method of simultaneously harvesting and packaging a plurality of frozen confectionery products which are mounted releasably on spurs, which comprises positioning a plurality of spaced rows of spaced confectionery products in front of a plurality of open boxes whereby each row is aligned with a single box, depositing said confectionery products in alignment with said open boxes, releasing said confectionery products from their respective spurs, and then simultaneously moving all of the confectionery products of a row into its respectively aligned box.

17. The method of simultaneously harvesting and packaging a plurality of frozen confectionery products which are mounted releasably on spurs, which comprises positioning a plurality of spaced rows of spaced confectionery products in front of a plurality of open boxes whereby each row is aligned with a single box, releasing said confectionery products from their respective spurs without altering substantially their alignment, and then moving all of the confectionery products of each row simultaneously into its aligned box.

18. The method of simultaneously harvesting and packaging a plurality of frozen confectionery products which are mounted releasably on spurs, which comprises positioning a plurality of spaced rows of spaced confectionery products before a series of open boxes whereby each row is aligned with a single box, releasing said confectionery products from their respective spurs without disturbing their alignment, and then moving simultaneously all of the spaced rows of spaced confectionery products until the confectionery products of each row are moved into their respectively aligned boxes.

NORMAN M. THOMAS.